(12) United States Patent
Beattie et al.

(10) Patent No.: US 9,422,817 B2
(45) Date of Patent: Aug. 23, 2016

(54) TURBINE BLADE ROOT WITH MICROCIRCUIT COOLING PASSAGES

(75) Inventors: Jeffrey S. Beattie, South Glastonbury, CT (US); Jeffrey Michael Jacques, East Hardford, CT (US); Justin D. Piggush, La Crosse, WI (US)

(73) Assignee: United Technologies Corporation, Farmington, CT (US)

( * ) Notice: Subject to any disclaimer, the term of this patent is extended or adjusted under 35 U.S.C. 154(b) by 1047 days.

(21) Appl. No.: 13/484,767

(22) Filed: May 31, 2012

(65) Prior Publication Data

US 2013/0323078 A1 Dec. 5, 2013

(51) Int. Cl.
*F01D 5/18* (2006.01)
*B22C 9/04* (2006.01)
*B22C 9/10* (2006.01)

(52) U.S. Cl.
CPC . *F01D 5/187* (2013.01); *B22C 9/04* (2013.01); *B22C 9/103* (2013.01); *F05D 2230/211* (2013.01); *F05D 2260/204* (2013.01); *Y02T 50/676* (2013.01); *Y10T 29/49316* (2015.01)

(58) Field of Classification Search
CPC ......... F01D 5/187; F01D 5/188; F01D 5/189; F01D 5/14; B22C 9/103; B22C 9/04; F05D 2260/204; F05D 2230/211; Y10T 29/49316; Y02T 50/676
See application file for complete search history.

(56) References Cited

U.S. PATENT DOCUMENTS

| | | | |
|---|---|---|---|
| 3,866,448 A | 2/1975 | Dennis et al. | |
| 6,347,660 B1 | 2/2002 | Sikkenga et al. | |
| 6,672,836 B2 | 1/2004 | Merry | |
| 6,932,571 B2 | 8/2005 | Cunha et al. | |
| 6,966,756 B2 | 11/2005 | McGrath et al. | |
| 6,991,430 B2 | 1/2006 | Stec et al. | |
| 7,581,928 B1 | 9/2009 | Cunha | |
| 7,597,539 B1 | 10/2009 | Liang | |
| 7,690,894 B1 | 4/2010 | Liang | |

(Continued)

FOREIGN PATENT DOCUMENTS

| | | |
|---|---|---|
| EP | 1655452 A2 | 5/2006 |
| EP | 2191910 A1 | 6/2010 |
| EP | 2193859 A1 | 6/2010 |

OTHER PUBLICATIONS

Search Report and Written Opinion for Singapore Application No. 11201407921V dated Jun. 11, 2015.

(Continued)

*Primary Examiner* — Igor Kershteyn
*Assistant Examiner* — Aaron R Eastman
(74) *Attorney, Agent, or Firm* — Carlson, Gaskey & Olds, P.C.

(57) ABSTRACT

A method of fabricating an airfoil includes the steps of fabricating a first core including a first plurality of ribs defining a first plurality of passages of a completed airfoil, and fabricating as second core including a second plurality of ribs defining a second plurality of passages of the completed airfoil. The second plurality of ribs includes a plurality of standoffs. The plurality of standoffs set a spacing between the first plurality of ribs and the second plurality of ribs to define a spacing between the first plurality of channels and the second plurality of channels of the completed airfoil. The airfoil is then molded about the core assembly. Once completed, the core assembly is removed to provide a completed airfoil incorporating multiple microcircuits with a desired stability and structural integrity.

20 Claims, 6 Drawing Sheets

(56) References Cited

U.S. PATENT DOCUMENTS

| | | | |
|---|---|---|---|
| 7,845,908 B1 | 12/2010 | Liang | |
| 8,079,811 B1 | 12/2011 | Liang | |
| 8,113,780 B2 * | 2/2012 | Cherolis | ............... B22C 7/02 416/97 R |
| 2003/0228221 A1 | 12/2003 | Bunker et al. | |
| 2004/0151587 A1 | 8/2004 | Cunha et al. | |
| 2004/0202542 A1 | 10/2004 | Cunha et al. | |
| 2005/0053459 A1 | 3/2005 | Cunha et al. | |
| 2005/0274478 A1 | 12/2005 | Verner et al. | |
| 2008/0008599 A1 | 1/2008 | Cunha et al. | |
| 2008/0219855 A1 | 9/2008 | Whitton | |
| 2010/0129217 A1 | 5/2010 | Cherolis et al. | |
| 2011/0274559 A1 | 11/2011 | Jenne et al. | |
| 2012/0027619 A1 | 2/2012 | Albert et al. | |

OTHER PUBLICATIONS

International Preliminary Report on Patentability for International Application No. PCT/US2013/041776 mailed Dec. 11, 2014.

International Search Report and Written Opinion for International Application No. PCT/US2013/041776 mailed on Feb. 26, 2014.

Ameri et al., Effect of Squealer Tip on Rotor Heat Transfer and Efficiency, ASME Journal of Turbomachinery, vol. 120, No. 4, Oct. 1998, pp. 753-759.

Supplementary European Search Report for EP Application No. 13827123.4 dated Apr. 8, 2016.

* cited by examiner

TURBINE BLADE ROOT WITH MICROCIRCUIT COOLING PASSAGES

BACKGROUND

This disclosure generally relates to a method of fabricating an airfoil and a core assembly for defining features within a completed airfoil.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils for vanes and blades in the turbine section are exposed to high temperature, high-speed exhaust gas flow. A stream of cooling airflow is therefore often provided along exposed surfaces. Cooling channels within the airfoil communicate cooling air to openings to generate the desired cooling airflow. Airfoils are typically molded parts and the internal cavities and passages required to communicate cooling airflow are provided by core assemblies over-molded during a molding process.

Core assemblies define the interior passages and channels within the airfoil and therefore improved core configurations that improve the molding process and improve performance are desirable.

SUMMARY

A method of fabricating an airfoil according to an exemplary embodiment of this disclosure, among other possible things includes fabricating a first core including a first plurality of ribs defining a first plurality of cooling passages of a completed airfoil assembly, wherein the first core is fabricated from a first material, fabricating as second core including a second plurality of ribs defining a second plurality of cooling passages of the completed airfoil assembly, wherein the second plurality of ribs includes a plurality of standoffs, wherein the second core is fabricated from a second material different than the first material, assembling the first core and the second core into a core assembly such that the plurality of standoffs set a spacing between the first plurality of ribs and the second plurality of ribs to define a spacing between the first plurality of cooling passages and the second plurality of passages of the completed airfoil, molding the airfoil assembly around the core assembly, and removing the core assembly including the first core and the second core.

A further embodiment of the foregoing method, wherein the plurality of standoffs extend from the second plurality of ribs.

A further embodiment of any of the foregoing methods, wherein the first plurality of ribs define a plurality of microcircuit cooling passages in the completed airfoil assembly.

A further embodiment of any of the foregoing methods, wherein the airfoil assembly includes a root portion, a platform and a tip with the first plurality of ribs defining the first plurality of cooling passages between the root portion and the platform.

A further embodiment of any of the foregoing methods, wherein the first core includes a third plurality of ribs separated from the first plurality of ribs for defining a third plurality of cooling passages from the platform to the tip.

A further embodiment of any of the foregoing methods, including cross ties between the first plurality of ribs and the second plurality of ribs for defining cross channels disposed proximate the platform between the first plurality of cooling passages and the third plurality of cooling passages in the completed airfoil assembly.

A further embodiment of any of the foregoing methods, wherein at least one of the first core and the second core include features for defining openings in a tip of a completed airfoil assembly.

A further embodiment of any of the foregoing methods, wherein the tip of the completed airfoil includes a recessed portion and the opening are defined in the recessed portion.

A further embodiment of any of the foregoing methods, wherein the first core defines a plurality of pedestals.

A further embodiment of any of the foregoing methods, wherein the first material comprises a refractory metal and the second material comprises a ceramic material.

A core assembly for fabricating an airfoil according to an exemplary embodiment of this disclosure, among other possible things includes a first core including a first plurality of ribs defining a first plurality of cooling passages of a completed airfoil assembly, the first core fabricated from a first material, a second core including a second plurality of ribs defining a second plurality of cooling passages of the completed airfoil assembly, the second core fabricated from a second material different than the first material, and a plurality of standoffs spacing the first plurality of ribs apart from the second plurality of ribs to define a spacing between the first plurality of cooling passages and the second plurality of cooling passages of a completed airfoil.

A further embodiment of the foregoing core assembly, wherein the plurality of standoffs extend from the second plurality of ribs.

A further embodiment of any of the foregoing core assemblies, wherein the first core includes a third plurality of ribs separated from the first plurality of ribs by a plurality of cross ties for defining cross channels disposed proximate a platform of a completed airfoil.

A further embodiment of any of the foregoing core assemblies, wherein at least one of the first core and the second core include features for defining openings in a tip of a completed airfoil.

A further embodiment of any of the foregoing core assemblies, wherein the tip of the completed airfoil includes a recessed portion and the openings are defined within the recessed portion.

A further embodiment of any of the foregoing core assemblies, wherein the first core defines a plurality of pedestals.

A further embodiment of any of the foregoing core assemblies wherein the first material comprises a refractory metal and the second material comprises a ceramic material.

A turbine airfoil assembly according to an exemplary embodiment of this disclosure, among other possible things includes a hollow airfoil section into which cooling flow is receivable from an end of an airfoil, the airfoil including pressure and suction sidewalls joined together at leading and trailing edges and extending from a root to a tip, a platform extending outward from the root, a first plurality of microcircuit cooling passages extending from the root to the tip, a first plurality of cooling passages extending from the root to the tip substantially parallel to the first plurality of microcircuit cooling passages, and a plurality of standoffs spacing the first plurality of microcircuit cooling passages apart from the first plurality of cooling passages.

A further embodiment of the foregoing turbine airfoil assembly, including a second plurality of microcircuit cooling passages extending from the platform to the tip and spaced apart from the first plurality of microcircuit cooling passages by a plurality of cross ties defining channels substantially transverse to the first and second plurality of microcircuit cooling passages.

A further embodiment of any of the foregoing turbine airfoil assemblies, wherein each of the first and second plurality of microcircuit cooling passages include an end that terminates at the cross ties proximate the platform.

A further embodiment of any of the foregoing turbine airfoil assemblies, including openings through the tip for cooling airflow.

A further embodiment of any of the foregoing turbine airfoil assemblies, including a plurality of pedestals within at least one of them first plurality of microcircuit cooling passages and the first plurality of cooling passages for generating improved thermal transfer to cooling airflow.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
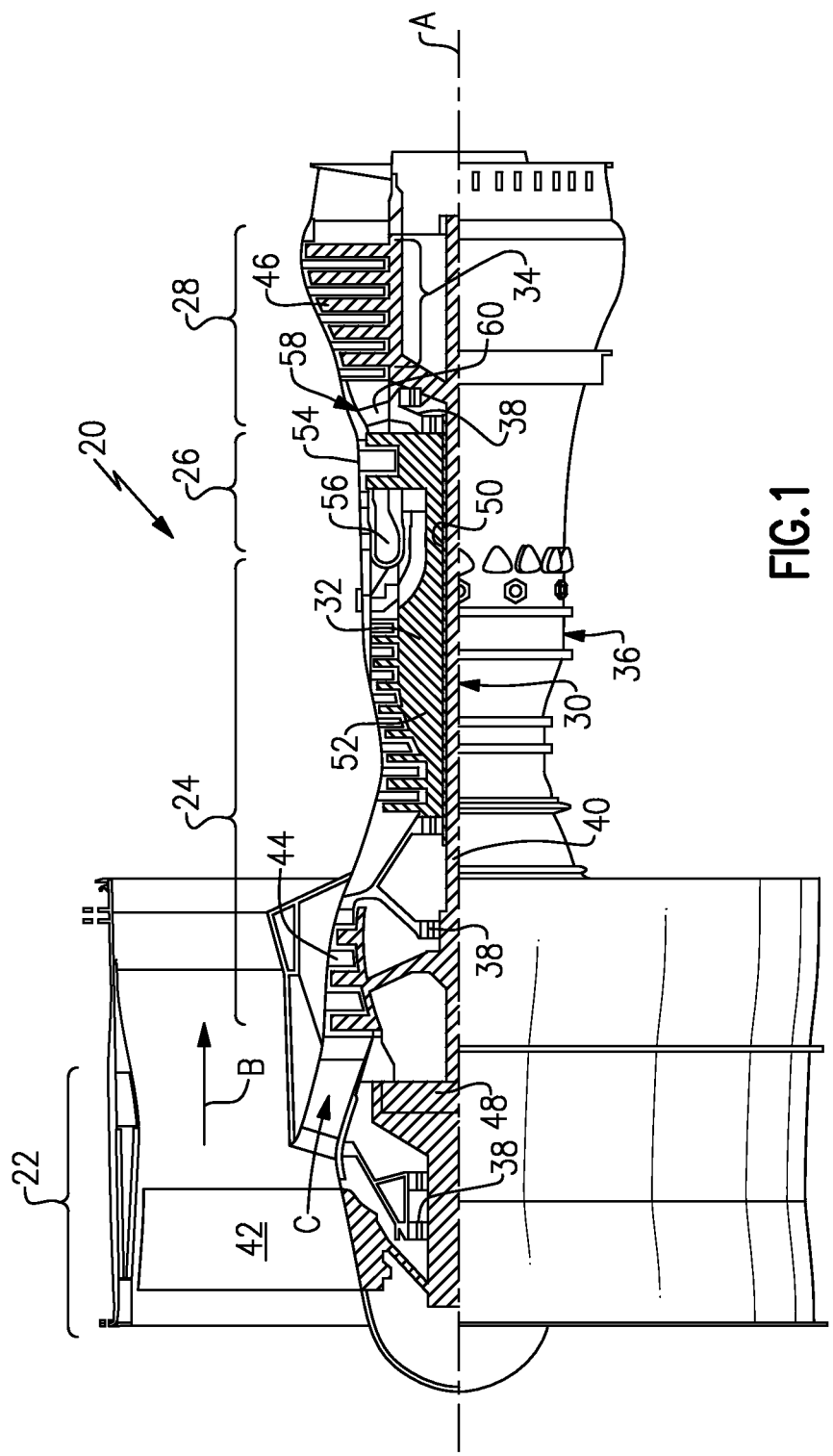
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
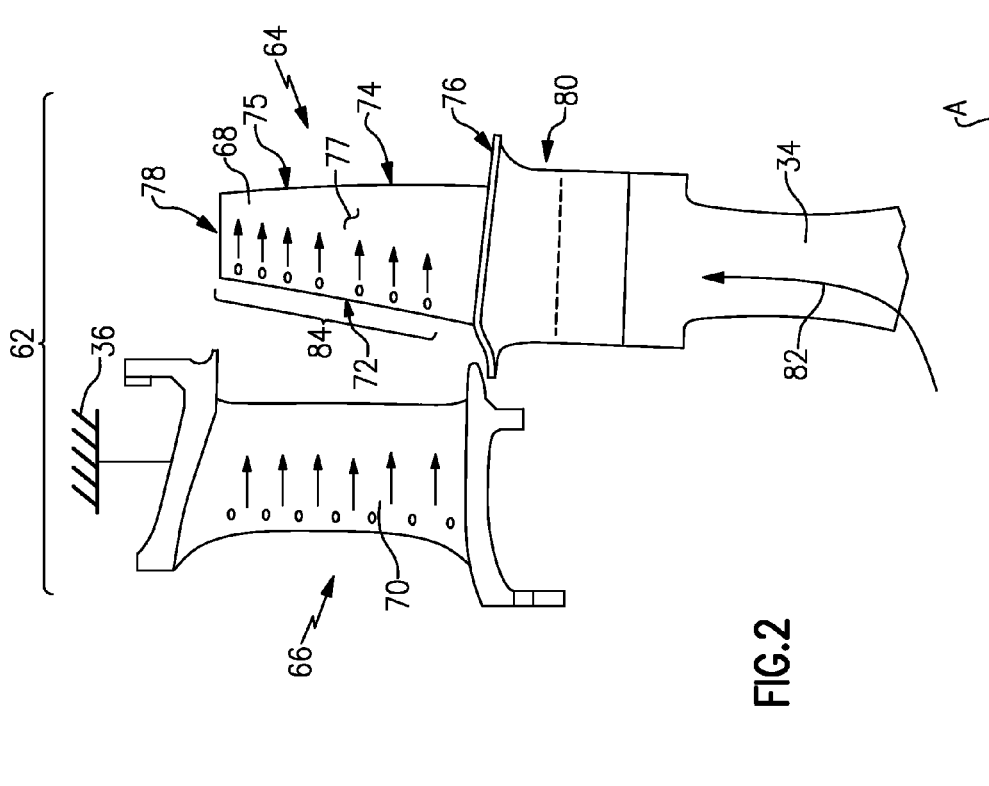
FIG. 2 is a side view of an example rotor stage.

Referring to FIG. 2 with continued reference to FIG. 1, an example rotor stage 62 includes a turbine blade 64 supported on a rotor 34. The example rotor stage 62 includes a fixed vane 66 supported by a portion of the engine static structure 36 and the turbine blade 64. The fixed vane 66 includes airfoil 70 and the turbine 64 includes airfoil 68. Both the vane 66 and the turbine blade 64 can include cooling features to aid in maintaining a desired temperature. The example turbine blade 64 includes a root portion 80 that corresponds with a shape of a slot in the rotor 34 for holding the turbine blade 64 within the rotor 34.

Cooling holes 84 communicate cooling airflow over the airfoil 68 to maintain a desired temperature of the airfoil surface. The film of cooling airflow emanating from the cooling holes 84 flows over the turbine blade surface to protect it from hot exhaust gasses produced during operation of the gas turbine engine 20. Cooling air is communicated through passages formed within the turbine blade 64 to the cooling holes 84.

Cooling air is fed through the rotor 34 into internal cavities defined within the turbine blade 64. In this example, cooling air as is indicated at 82 flows through the rotor 34 into cooling passages defined within the turbine blade 64. The example turbine blade 64 includes a pressure side 75 and suction side 77 joined together at a leading edge 72 and trailing edge 74. The example turbine blade 64 extends from the airfoil tip 78 to the root portion 80. The airfoil 68 extends from a platform 76 defined near the root portion 80 to the tip 78. The platform 76 defines a path for the hot gas stream generated in the combustor 56.

The example turbine blade 64 is cast as a hollow article including plurality of separate passages and cavities for communicating cooling airflow throughout the turbine blade 64. The separate passages form a plurality of serpentine channels that communicate cooling air flow 82 into the turbine blade 64 and finally through the cooling film holes 84.

Figure 3:
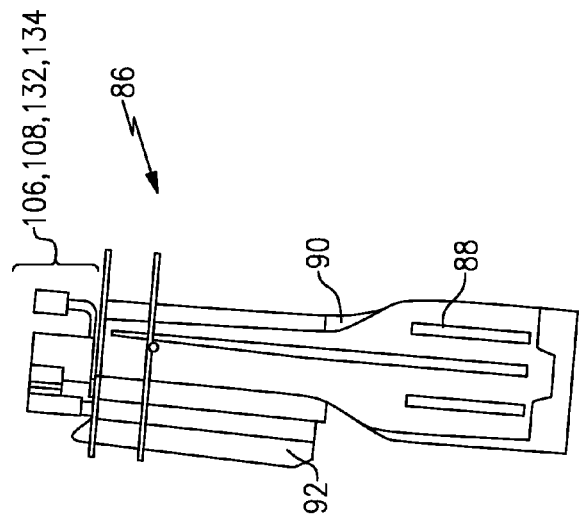
FIG. 3 is a side view of an example core assembly.

Referring to FIG. 3 with continued reference to FIG. 2 to define the internal channels desired within the turbine blade 64, a core assembly 86 is provided that includes a first core part 88, a second core part 90, and a third core part 92. Each of the core parts 88, 90, and 92 define different channels that extend from the root portion 80 through the turbine blade 64 and the airfoil 68 to a tip portion 78. In this example, the first core part 88 is fabricated from a refractory metal core and the second core part 90 is fabricated as a ceramic core. It should be understood that other materials utilized for core assemblies are also within the contemplation of this disclosure.

Manufacturing of an example turbine blade assembly includes the initial step of fabricating a core assembly that includes features that define desired internal passages of the completed airfoil. The core assembly is then inserted into a mold or other molding fixture and surrounded by a molted material that will comprise the completed airfoil assembly. The molten material then cures and hardens about the core assembly. Once the molten material has cured, the core assemblies are removed through known methods.

The different channels and passages in the turbine blade 64 are used to feed the various cooling holes 84. It is desirable to provide dedicated microcircuit cooling passages to communicate cooling airflow to specific regions in the airfoil separate from other passages and channels. The term microcircuit is utilized in this disclosure to describe cooling passages having a relatively small cross-section. The microcircuit cooling passages provide a steady flow of cooling air to specific areas of the turbine blade 64 to provide specific cooling attributes and characteristics that are localized depending on the specific application, environment and design of the turbine blade 64.

Accordingly, it is desirable to define the core assembly 86 to include and define the desired cooling passages while maintaining certain minimal strength and durability attributes.

Figure 4:
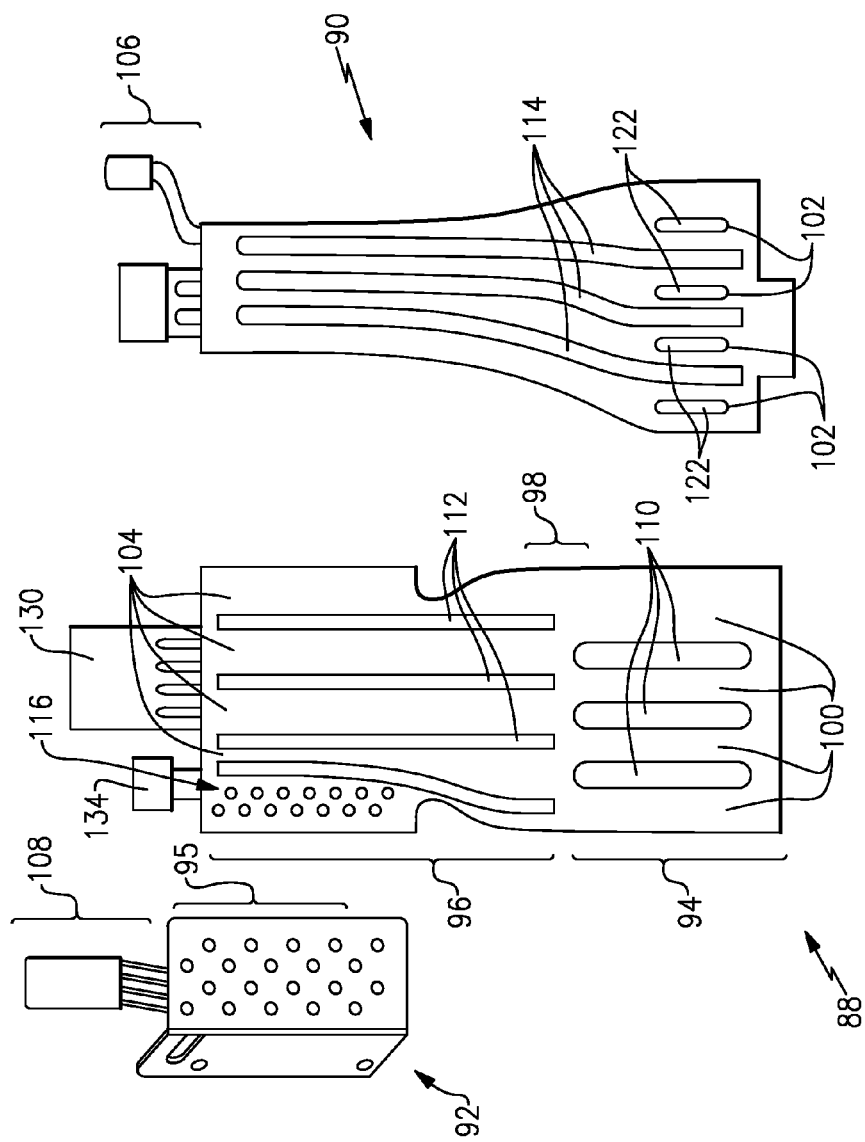
FIG. 4 is a view of separate portions of the example core assembly.

Referring to FIG. 4 with continued reference to FIGS. 2 and 3, the example core assembly 86 is shown with specific core portions separated for clarity. As appreciated, the example core assembly 86 is shown with a first core portion 88, a second core portion 90, and a third core portion 92. Although the example core assembly 86 includes three core portions, any number of core portions is within the contemplation of this disclosure.

Each of the core portions 88, 90 and 92 comprises a solid material that defines open channels within a completed turbine blade airfoil. Each of the cores 88, 90, and 92 includes openings intermixed with solid rib portions. The openings within the core portions 88, 90, and 92 define solid features within the completed blade 64. The solid features of the core portions 88, 90, and 92 define hollow features, passages and channels formed within the completed blade 64.

In the disclosed example, the first core portion 88 defines a plurality of microcircuits within the example turbine blade 64. The example first core assembly 88 includes ribs 100 that are solid and therefore define open spaces within the completed turbine blade 64. The first core assembly 88 also includes slots 110 that define solid ribs within the turbine blade 64. A plurality of openings 116 disposed in an upper region of the first core 88 defines a plurality of pedestals within cooling passages of the completed turbine blade 64. Pedestals (not shown) defined by the openings 116 disrupt airflow to generate a desired mixing or turbulent airflow to enhance cooling characteristics in certain locations of a completed turbine blade 64.

A second set of ribs 104 are defined within the first core portion 88 and are spaced between slots 112 that define ribs in a completed turbine blade 64. The slots 112 and ribs 104 are spaced apart from the ribs 100 and slots 110 such that an intermediate section or cross-tie section 98 extends between them. The cross-tie section 98 defines cross channels 99 in the completed turbine blade 64. Because the first core portion 88 does not include continuous channels from the bottom portion to the tip portion, the cross-ties 98 are utilized to define cross-channels that form a passage that communicates airflow between passages formed by the ribs 104 and 100.

The second core assembly 90 defines a plurality of cooling air channels that extend from the root 80 to the tip 78. The core portion 90 includes opening slots 114 that define ribs within a completed turbine blade assembly 64. The solid portions 102 between the spaces 114 define the cooling channels. The second core portion 90 also includes an element 106 that defines openings through the tip 78 of the example turbine vane 64.

The second core 90 also includes standoff nubs 122 that extend outward from the solid portions 102 to define a desired spacing between core portions 88, 90.

The third core portion 92 includes a plurality of openings 95 that define pedestals within the completed airfoil. As discussed above, the pedestals generate desired airflow characteristics that improve cooling in localized regions of the completed turbine blade 64. The third core assembly 92 also includes a tip element 108 that will define openings through the tip 78.

The example core assembly 86 (FIG. 3) includes each of the core portions 88, 90, and 92 that are assembled and inserted within a mold during the molding process. In this example, the first core portion 88 defines a plurality of microcircuits that extend from the root portion 80 of a completed airfoil all the way to the tip portion 78. The second core portion 90 defines parallel cooling passages that extend from the root portion 80 to the tip portion 78. Each of the first and second core assemblies 88 and 90 define separate cooling circuits that communicate cooling airflow to specific locations within a completed turbine blade 64. Contact between the first and second core portions 88 and 90 can result in a cross communication of cooling air between the separate passages and is not desirable. The example second core 90 includes features for maintaining spacing with the first core portion 88.

Figure 5:
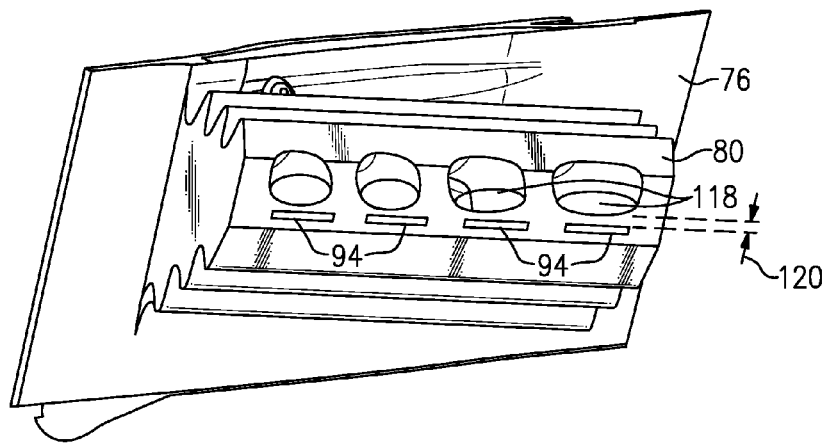
FIG. 5 is a bottom view of an example completed airfoil assembly.
Figure 6:
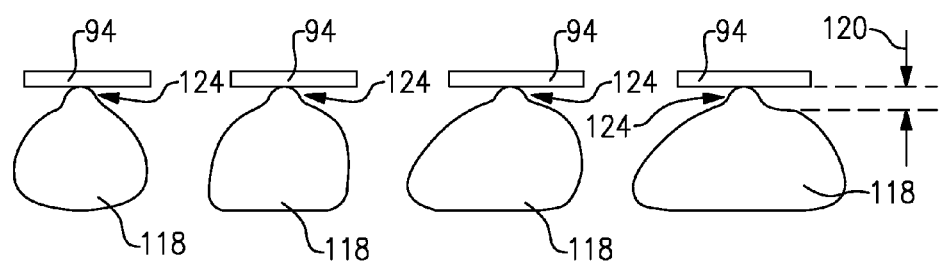
FIG. 6 is a schematic view of example cooling channels within a turbine blade.

Referring to FIGS. 5 and 6 with continued reference to FIG. 4, a bottom end of the example turbine blade 64 is shown and includes completed passages 118 defined by the second core portion 90 in proximity to completed microcircuit cooling passages 94 defined by the first core portion 88. A desired spacing indicated at 120 is provided to prevent cross communication of cooling air between the cooling passages 118 and the microcircuit cooling passages 94. In order to maintain the desired spacing 120, the standoff nubs 122 extend from ribs 102 (FIG. 4) to space apart the second core portion 90 from the first core portion 88.

FIG. 6 illustrates the spacing 120 between the cooling passages 118 and the microcircuit cooling passages 94. As appreciated, the standoff nubs 122 formed on the second core portion 90 define standoffs 124 in the cooling passages 118. The standoff nubs 122 are solid features that form the hollow standoffs 124 in the completed part.

The standoffs nubs 122 define a point contact between the first core portion 88 and the second core portion 90. Accordingly, the standoff nubs 122 in the second core portion 90 define a point contact with ribs 100 in the first core portion 88. The defined point contact maintains the desired spacing between core portions 88, 90 that produce the desired spacing in the completed cooling passages 94, 118.

In the completed turbine blade 64, cooling passages 118 include the standoff 124 that extends towards the microcircuit passages 94. As appreciated, the surfaces between the standoffs 124 and the microcircuit cooling passages 94 define a point contact. Therefore, if upon completion of molding of the turbine blade 64 an opening between the cooling passages is created, that opening will be minimized due to the point contact defined by the standoff nubs 122 formed as part of the second core portion 90. Accordingly, the nubs 122 provide a desired spacing between the first and second core portions 88 and 90 that maintain the desired spacing 120 between the cooling air channels 118 and the microcircuit cooling passages 94.

Figure 7:
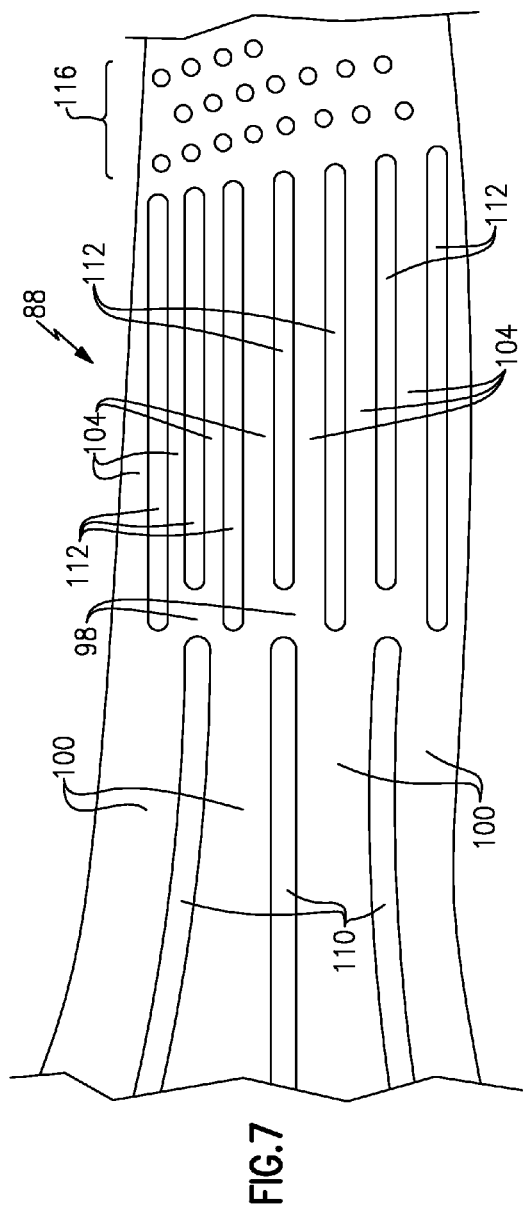
FIG. 7 is an enlarged view of a portion of an example first core assembly.
Figure 8:
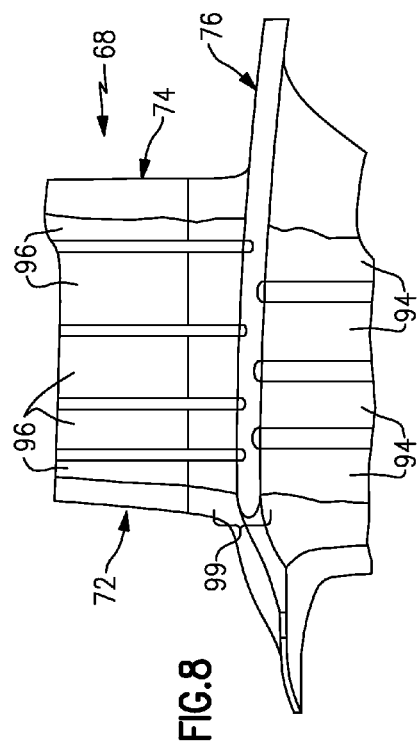
FIG. 8 is schematic view of example turbine blade including cooling channels.

Referring to FIGS. 7 and 8 with continued reference to FIG. 4, the first core portion 88 includes a first set of ribs 100 that define the microcircuit cooling passages 94 in the completed turbine blade 64. The first core portion 88 also includes the second plurality of ribs 104 that define a second plurality of micro channels 96. The second plurality of ribs 104 are disposed above the first plurality of ribs 110 that define the first plurality of microcircuit cooling passages 94.

The first core portion 88 is comprised of a refractory metal core. A refractory metal core is a thin sheet of material that is bendable to define the desired shape that corresponds with the profile of the airfoil 70 and turbine blade 64. However, upon bending the core portion 88 it can become fragile during operation and thereby complicate assembly. A rib or slot that extends from the root portion 88 all the way to the tip portion 78 can complicate the molding process. Accordingly, the example first core 88 includes the cross tie portion 98. The cross ties 98 interrupt the continuous channel or rib from the tip portion to the root portion at the bend that is formed within the core 88 proximate the platform 76 of a completed turbine blade 64.

The first core portion 88 provides for spacing of microcircuit passages 94 and 96 longitudinally in the completed turbine blade 64. The example turbine blade assembly 64 includes the first plurality of microcircuit passages 94 that extend from the root portion 80 to the platform 76. The second plurality of microcircuits 96 extend from the platform 76 to the tip 78. The first and second plurality of microcircuits are separated by cross channels 99 defined by the cross ties 98 in the first core portion 88.

Accordingly, the first core portion 88 includes features that strengthen not only the core portion 88 to ease manufacturing complexities but also provide an increased strength and other desirable mechanical properties of the completed turbine blade 64.

Figure 9:
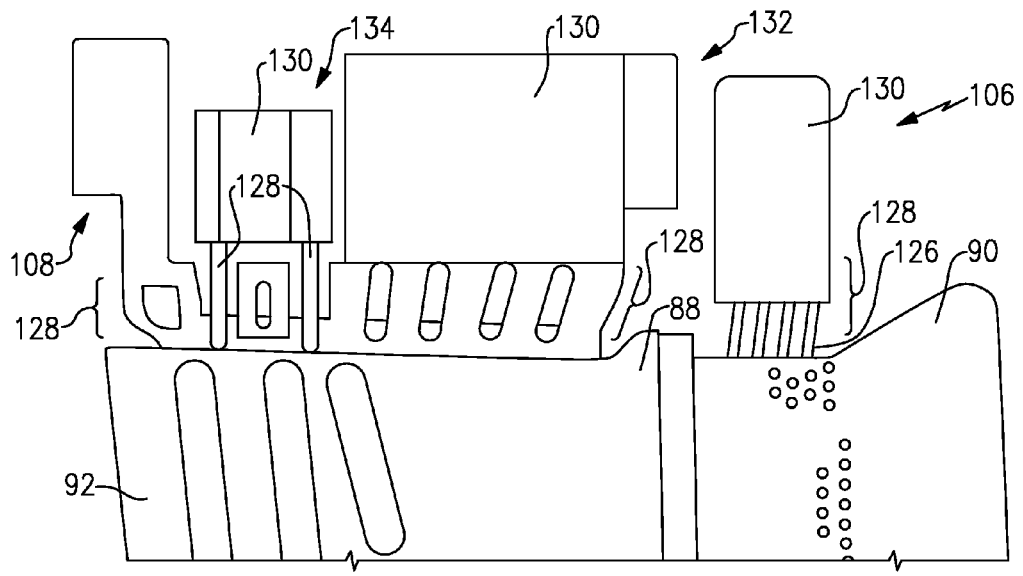
FIG. 9 is an enlarged view of a top portion of the core assembly.
Figure 10:
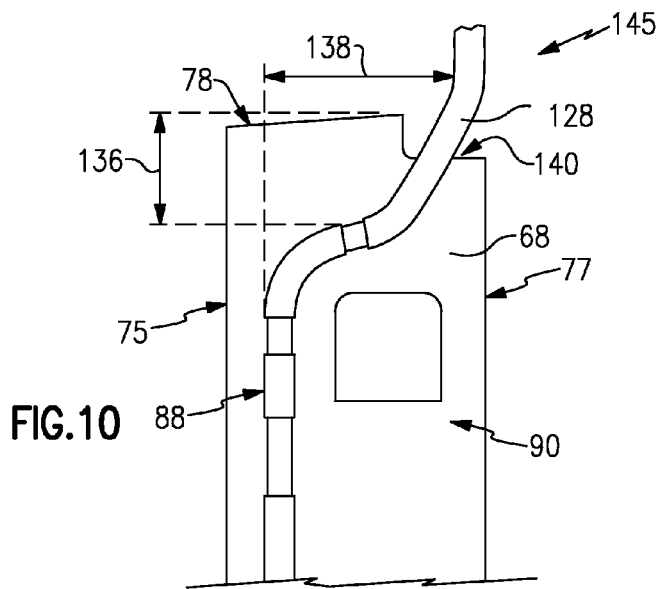
FIG. 10 is a cross sectional view of a portion of the completed airfoil assembly.

Referring to FIGS. 9 and 10, with continued reference to FIG. 2, the tip core elements 106, 108, 132 and 134 of the core assembly 86 extend upward past an upper surface 126 of the core assembly 86. The upper surface 126 of the core assembly 86 defines an uppermost portion of the inner cavity and cooling passages formed within the turbine blade 64. In this example additional tip elements 132 and 134 are shown attached to one of the core portions 88, 90, 92 of the core assembly 86. Each of the tip elements 106,108,132 and 134 include a head portion 130 and finger portions 128. The head portion 130 is provided for clamping and holding of the core assembly 86 in a desired orientation during the molding operation. The finger portions 128 extend upward from the surface 126 and define openings that will be formed in the tip 78.

Referring to FIG. 10 with continued reference to FIGS. 2 and 9, the example first core 88 includes the fingers 128 that extend upward through the tip 78 to define tip openings 140. The example fingers 128 are offset from the core 88 within the airfoil 68 a distance 138 in a direction between the suction and pressure sides of the airfoil 68. The fingers 128 begin a bend to provide the offset 138 a distance 136 from the tip 78. The offset of the fingers 128 provide for the openings 140 to be supplied by the microcircuit cooling passages 94, 96 defined by the first core 88 while being disposed over the larger cooling channels 118 defined by the second core portion 90. The example tip 78 includes a recessed portion 145 and the example openings extend through the recessed portion 145.

Although the example openings 140 extend through the recessed portion, the openings 140 could extend through the tip surface. Moreover, although the example second core portion 90 includes the tip element 108, it is within the contemplation of this disclosure that the core portions 88, 90, 92 may not include tip elements 106,108 and 132 are some may include them while others do not.

Once the turbine blade 64 has been cast, the tip elements 106, 108, 132 and 134 are machined away and removed. Subsequent removal of any remaining core material reveals the openings 140 that are defined within the tip 78 of the example turbine blade 64.

Accordingly, the example core assembly the microcircuit cooling passages that feed cooling holes that deliver targeted cooling airflow. The core assembly defining the microcircuits is stabilized during casting and in the completed turbine vane assembly with standoffs and crossties to enable incorporation of multiple microcircuits with a desired blade stability and structural integrity.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of fabricating an airfoil assembly comprising:
fabricating a first core including a first plurality of ribs defining a first plurality of cooling passages of a completed airfoil assembly, wherein the first core is fabricated from a first material;
fabricating as second core including a second plurality of ribs defining a second plurality of cooling passages of the completed airfoil assembly, wherein the second plurality of ribs includes a plurality of standoffs, wherein the second core is fabricated from a second material different than the first material;
assembling the first core and the second core into a core assembly such that the plurality of standoffs set a spacing between the first plurality of ribs and the second plurality of ribs to define a spacing between the first plurality of cooling passages and the second plurality of passages of the completed airfoil, wherein at least one of the first core and the second core include features for defining openings in a tip of a completed airfoil assembly, the tip of the completed airfoil includes a recessed portion and the openings are defined in the recessed portion;
molding the airfoil assembly around the core assembly; and
removing the core assembly including the first core and the second core.

2. The method as recited in claim 1, wherein the plurality of standoffs extend from the second plurality of ribs.

3. The method as recited in claim 1, wherein the first plurality of ribs define a plurality of microcircuit cooling passages in the completed airfoil assembly.

4. The method as recited in claim 1, wherein the airfoil assembly includes a root portion, a platform and a tip with the first plurality of ribs defining the first plurality of cooling passages between the root portion and the platform.

5. The method as recited in claim 4, wherein the first core includes a third plurality of ribs separated from the first plurality of ribs for defining a third plurality of cooling passages from the platform to the tip.

6. The method as recited in claim 5, including cross ties between the first plurality of ribs and the third plurality of ribs for defining cross channels disposed proximate the platform between the first plurality of cooling passages and the third plurality of cooling passages in the completed airfoil assembly.

7. The method as recited in claim 1, wherein the first core defines a plurality of pedestals.

8. The method as recited in claim 1, wherein the first material comprises a refractory metal and the second material comprises a ceramic material.

9. The method as recited in claim 1, including supporting a third core on one of the first core and the second core, and defining openings through a tip of the airfoil with portions of the third core.

10. The method as recited in claim 1, wherein the recessed portion comprises a surface disposed radially inward of the tip.

11. A core assembly for fabricating an airfoil comprising:
a first core including a first plurality of ribs defining a first plurality of cooling passages of a completed airfoil assembly, the first core fabricated from a first material;
a second core including a second plurality of ribs defining a second plurality of cooling passages of the completed airfoil assembly, the second core fabricated from a second material different than the first material, wherein the tip of the completed airfoil includes a recessed portion and at least one of the first core and the second core include features for defining openings in the recessed portion of the tip,
a plurality of standoffs spacing the first plurality of ribs apart from the second plurality of ribs to define a spacing between the first plurality of cooling passages and the second plurality of cooling passages of a completed airfoil.

12. The core assembly as recited in claim 11, wherein the plurality of standoffs extend from the second plurality of ribs.

13. The core assembly as recited in claim 11, wherein the first core includes a third plurality of ribs separated from the first plurality of ribs by a plurality of cross ties for defining cross channels disposed proximate a platform of a completed airfoil.

14. The core assembly as recited in claim 11, wherein the first core defines a plurality of pedestals.

15. The core assembly as recited in claim 11, wherein the first material comprises a refractory metal and the second material comprise a ceramic material.

16. The core assembly as recited in claim 11, including a third core supported on one of the first core and the second core, the third core defining openings through the tip.

17. A turbine airfoil assembly comprising:
a hollow airfoil section into which cooling flow is receivable from an end of an airfoil, the airfoil including pressure and suction sidewalls joined together at leading and trailing edges and extending from a root to a tip, the tip including a recessed portion, the recessed portion defining a surface spaced apart from the tip in a direction toward the root portion;
a platform extending outward from the root;
a first plurality of microcircuit cooling passages extending from the root to the tip;
a first plurality of cooling passages extending from the root to the tip substantially parallel to the first plurality of microcircuit cooling passages;
openings through the tip and defined within the recessed portion, the openings in communication with one of the first plurality of microcircuit cooling passages and the first plurality of cooling passages for providing cooling within the recessed portion; and
a plurality of standoffs spacing the first plurality of microcircuit cooling passages apart from the first plurality of cooling passages.

18. The turbine airfoil assembly as recited in claim 17, including a second plurality of microcircuit cooling passages extending from the platform to the tip and spaced apart from the first plurality of microcircuit cooling passages by a plurality of cross ties defining channels substantially transverse to the first and second plurality of microcircuit cooling passages.

19. The turbine airfoil assembly as recited in claim 18, wherein each of the first and second plurality of microcircuit cooling passages include an end that terminates at the cross ties proximate the platform.

20. The turbine airfoil assembly as recited in claim 17, including a plurality of pedestals within at least one of them first plurality of microcircuit cooling passages and the first plurality of cooling passages for generating improved thermal transfer to cooling airflow.

* * * * *